United States Patent [19]
Liem

[11] Patent Number: 6,164,459
[45] Date of Patent: Dec. 26, 2000

[54] COIN OPERATED BICYCLE LOCKING RACK

[76] Inventor: Ken Liem, 6 Morgan Suite 100, Silverado, Calif. 92718

[21] Appl. No.: 09/234,697

[22] Filed: Jan. 21, 1999

[51] Int. Cl.⁷ .................................................. E05B 73/00
[52] U.S. Cl. ..................................... 211/5; 211/20; 211/22
[58] Field of Search ................................ 211/17, 20, 18, 211/22, 19, 23; D12/115; 70/234, 233, 18; 248/571, 123.1, 219.1

[56] References Cited

U.S. PATENT DOCUMENTS

| | | | |
|---|---|---|---|
| D. 361,539 | 8/1995 | Matlaga | D12/115 |
| 636,629 | 11/1899 | Butcher | 70/234 X |
| 668,259 | 2/1901 | Krimmert | 211/17 X |
| 706,718 | 8/1902 | Bradbury | 211/22 |
| 2,682,958 | 7/1954 | Francis | 214/16.1 |
| 2,970,701 | 2/1961 | Fetter | 211/78 |
| 3,682,523 | 8/1972 | Esposito | 211/23 X |
| 3,770,133 | 11/1973 | Kolker | 211/19 |
| 4,566,842 | 1/1986 | Clarke | 414/462 |
| 4,778,176 | 10/1988 | Shoemaker, Jr. | 273/1 GC |
| 5,036,987 | 8/1991 | Smiedt | 211/22 |
| 5,083,729 | 1/1992 | Saeks et al. | 211/22 |
| 5,086,930 | 2/1992 | Saeks | 211/17 |
| 5,183,162 | 2/1993 | Ritzenthaler | 211/18 X |
| 5,772,205 | 6/1998 | Coldebella et al. | 273/121 A |
| 5,845,788 | 12/1998 | Robolin | 211/17 |
| 5,983,694 | 11/1999 | Woodrow et al. | 72/238 |
| 5,988,006 | 11/1999 | Fleytman | 74/425 |
| 6,015,367 | 1/2000 | Scaramucci | 482/5 |
| 6,021,990 | 2/2000 | Freund | 248/429 |
| 6,022,056 | 2/2000 | Cope et al. | 292/144 |
| 6,043,796 | 3/2000 | Shinkawa et al. | 343/903 |
| 6,058,987 | 5/2000 | Liao | 144/130 |

FOREIGN PATENT DOCUMENTS

| | | | |
|---|---|---|---|
| 659148 | 2/1965 | Belgium | 211/20 |
| 2546123 | 11/1984 | France | 211/22 |

*Primary Examiner*—Daniel P. Stodola
*Assistant Examiner*—Khoa Tran

[57] ABSTRACT

A bicycle locking rack for suspending a plurality of bicycles above the ground to save space and prevent theft. The bicycle locking rack includes an elongated pole having a lower end secured within a ground surface. A plurality of pulley systems are disposed within the elongated pole. Each of the pulley systems include an upper pulley and a lower pulley. The upper pulley and the lower pulley have a cable extending therearound. A plurality of bicycle braces are secured to the cables of the plurality of pulley systems. The bicycle braces support bicycles in a vertical orientation. A coin operated control panel is secured to the elongated pole. A motor is disposed in the elongated pole. The motor is in communication with the plurality of pulley systems for selectively raising or lowering the bicycle braces with respect to the ground surface.

1 Claim, 3 Drawing Sheets

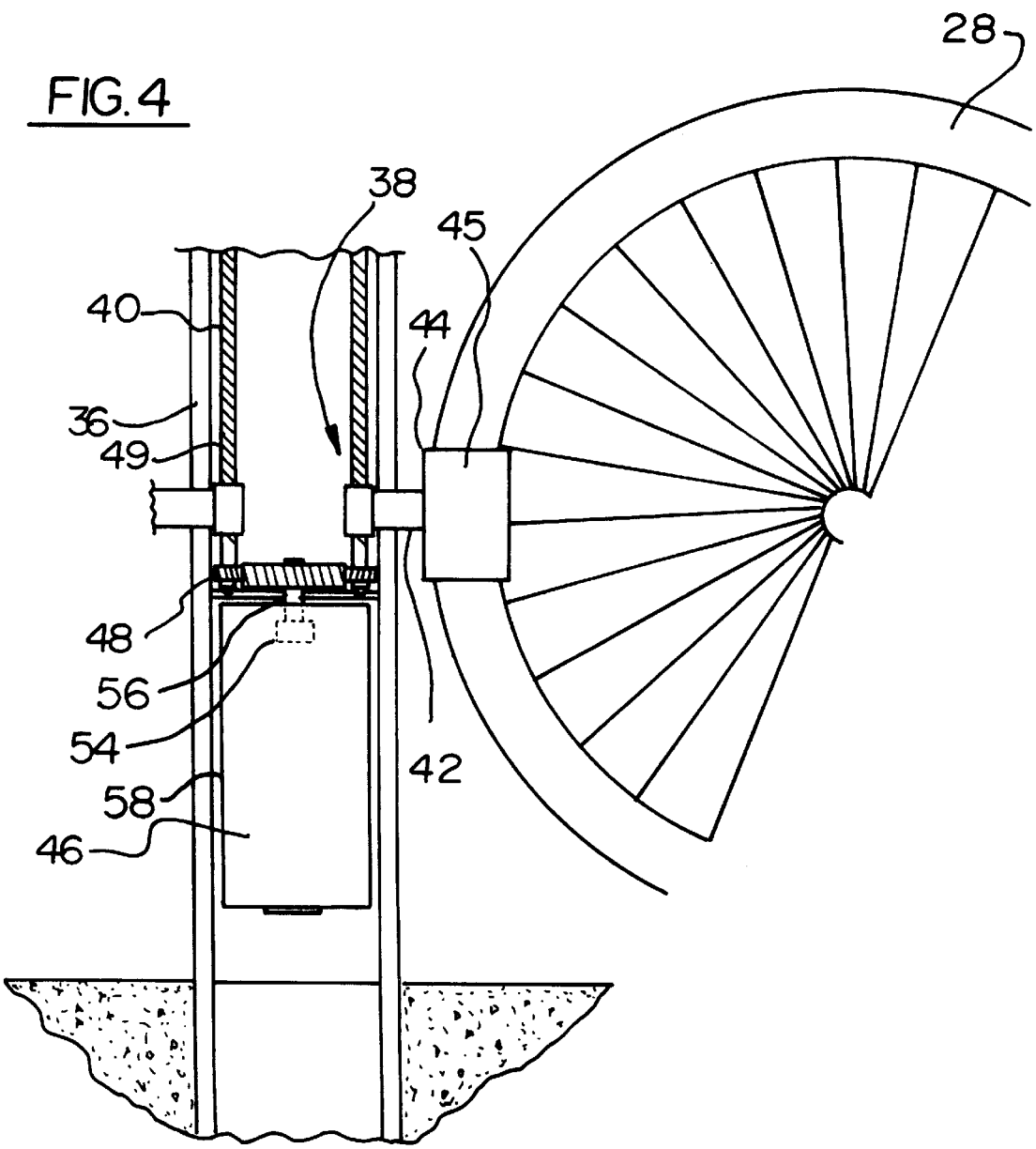

COIN OPERATED BICYCLE LOCKING RACK

BACKGROUND OF THE INVENTION

1. Field of the Invention

The present invention relates to coin operated bicycle locking rack and more particularly pertains to a new coin operated bicycle locking rack for storing and locking a plurality of bicycles.

2. Description of the Prior Art

The use of bicycle racks is known in the prior art. More specifically, bicycle racks heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle racks include U.S. Pat. No. 4,433,787 to Cook et al.; U.S. Pat. No. 4,830,167 to Lassche; U.S. Pat. No. 4,392,572 to Bernard; U.S. Pat. No. 5,278,538 to Ainsworth et al.; U.S. Pat. No. 3,212,770 to Stephens; and U.S. Pat. No. 511,367 to Slater.

While these devices fulfill their respective, particular objectives and requirements, the aforementioned patents do not disclose a new coin operated bicycle locking rack. The inventive device includes an elongated pole having a lower end secured within a ground surface. A plurality of pulley systems are disposed within the elongated pole. Each of the pulley systems include an upper pulley and a lower pulley. The upper pulley and the lower pulley have a cable extending therearound. A plurality of bicycle braces are secured to the cables of the plurality of pulley systems. The bicycle braces support bicycles in a vertical orientation. A coin operated control panel is secured to the elongated pole. A motor is disposed in the elongated pole. The motor is in communication with the plurality of pulley systems for selectively raising or lowering the bicycle braces with respect to the elongated pole.

In these respects, the coin operated bicycle locking rack according to the present invention substantially departs from the conventional concepts and designs of the prior art, and in so doing provides an apparatus primarily developed for the purpose of storing and locking a plurality of bicycles.

SUMMARY OF THE INVENTION

In view of the foregoing disadvantages inherent in the known types of bicycle racks now present in the prior art, the present invention provides a new coin operated bicycle locking rack construction wherein the same can be utilized for storing and locking a plurality of bicycles.

The general purpose of the present invention, which will be described subsequently in greater detail, is to provide a new coin operated bicycle locking rack apparatus and method which has many of the advantages of the bicycle racks mentioned heretofore and many novel features that result in a new coin operated bicycle locking rack which is not anticipated, rendered obvious, suggested, or even implied by any of the prior art bicycle racks, either alone or in any combination thereof.

To attain this, the present invention generally comprises an elongated pole having a lower end secured within a ground surface. An upper end of the elongated pole has a light control box secured therein. The light control box has a plurality of lights in communication therewith. The upper end has a canopy secured thereto. A plurality of pulley systems are disposed within the elongated pole. Each of the pulley systems include an upper pulley and a lower pulley. The upper pulley and the lower pulley have a cable extending therearound. A plurality of bicycle braces are secured to the cables of the plurality of pulley systems. The bicycle braces support bicycles in a vertical orientation. The bicycle braces include a forward wheel support and a rear wheel support. The forward wheel supports have a generally U-shaped configuration. The forward wheel supports are dimensioned for receiving a front wheel of a bicycle therein. The rear wheel supports are disposed below the forward wheel supports. The rear wheel supports are arcuate and in an essentially vertical orientation. The rear wheel supports have a back wheel of the bicycle resting thereon when the front wheel is positioned within the forward wheel supports. A coin operated control panel is secured to the elongated pole. A motor is disposed in the elongated pole. The motor is in communication with the plurality of pulley systems for selectively raising or lowering the bicycle braces with respect to the elongated pole.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new coin operated bicycle locking rack apparatus and method which has many of the advantages of the bicycle racks mentioned heretofore and many novel features that result in a new coin operated bicycle locking rack which is not anticipated, rendered obvious, suggested, or even implied by any of the prior art coin operated bicycle locking rack, either alone or in any combination thereof.

It is another object of the present invention to provide a new coin operated bicycle locking rack which may be easily and efficiently manufactured and marketed.

It is a further object of the present invention to provide a new coin operated bicycle locking rack which is of a durable and reliable construction.

An even further object of the present invention is to provide a new coin operated bicycle locking rack which is susceptible of a low cost of manufacture with regard to both materials and labor, and which accordingly is then susceptible of low prices of sale to the consuming public, thereby making such coin operated bicycle locking rack economically available to the buying public.

Still yet another object of the present invention is to provide a new coin operated bicycle locking rack which provides in the apparatuses and methods of the prior art some of the advantages thereof, while simultaneously overcoming some of the disadvantages normally associated therewith.

Still another object of the present invention is to provide a new coin operated bicycle locking rack for storing and locking a plurality of bicycles.

Yet another object of the present invention is to provide a new coin operated bicycle locking rack which includes an elongated pole having a lower end secured within a ground surface. A plurality of pulley systems are disposed within the elongated pole. Each of the pulley systems include an upper pulley and a lower pulley. The upper pulley and the lower pulley have a cable extending therearound. A plurality of bicycle braces are secured to the cables of the plurality of pulley systems. The bicycle braces support bicycles in a vertical orientation. A coin operated control panel is secured to the elongated pole. A motor is disposed in the elongated pole. The motor is in communication with the plurality of pulley systems for selectively raising or lowering the bicycle braces with respect to the elongated pole.

Even still another object of the present invention is to provide a new coin operated bicycle locking rack that saves space by suspending bicycles above the ground.

Yet even still another object of the present invention is to provide a new coin operated bicycle locking rack that is more theft-deterrent than racks storing bicycles on the ground because the bicycles are suspended and therefore harder to get at to steal or vandalize.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a partial cross-sectional view of an alternate embodiment of the present invention.

DESCRIPTION OF THE PREFERRED EMBODIMENT

Figure 1:
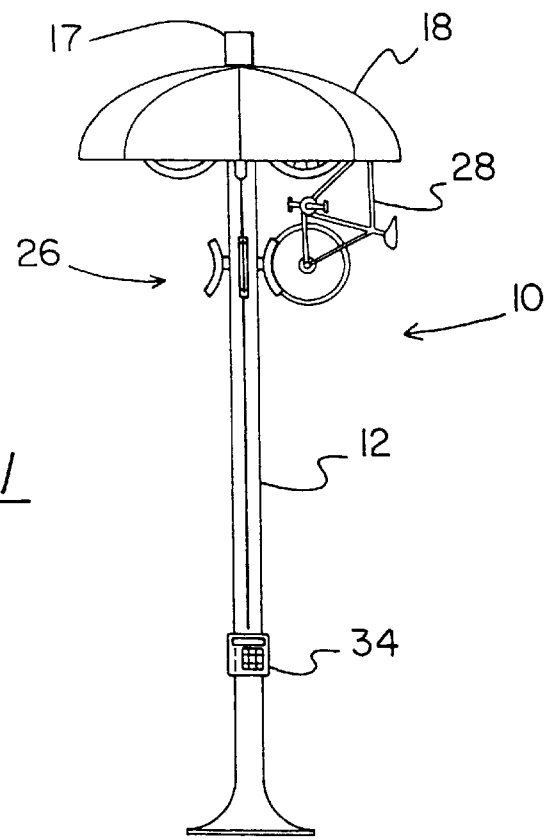
FIG. 1 is a front view of a preferred embodiment according to the present invention.
Figure 2:
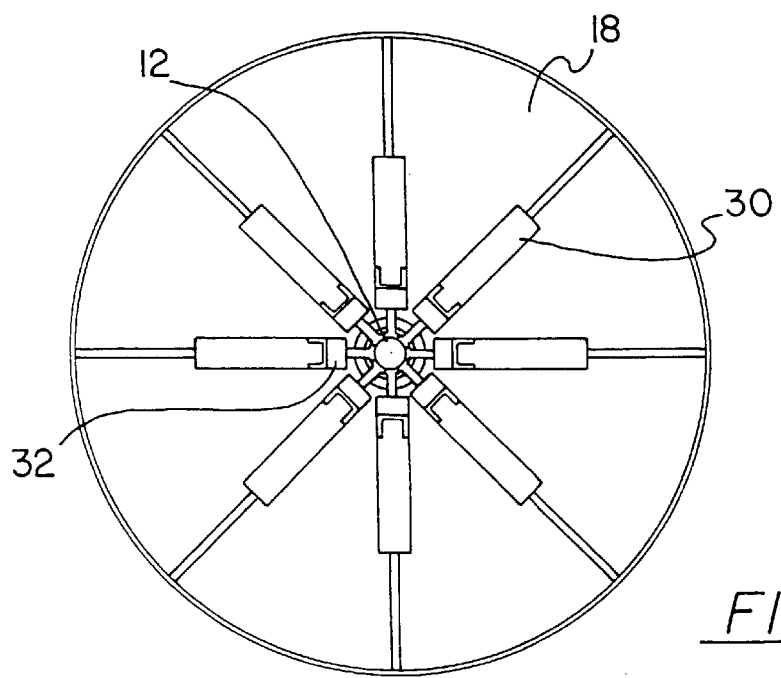
FIG. 2 is a top plan view of the present invention.

With reference now to the drawings, and in particular to FIGS. 1 through 4 thereof, a new coin operated bicycle locking rack embodying the principles and concepts of the present invention and generally designated by the reference numeral 10 will be described.

As best illustrated in FIGS. 1 through 4, the coin operated bicycle locking rack 10 comprises an elongated pole 12 having a lower end secured within a ground surface. An upper end of the elongated pole 12 has a light control box 14 secured therein. Preferably, the light control box 14 has a plurality of lights 16 in communication therewith. Ideally, the upper end has a canopy 18 secured thereto. The canopy 18 can be extended to provide additional coverage. Also ideally, the light control box has a plurality of first lights 16 and a second light 17 in communication with it. The first lights 16 are positioned under the canopy. The second light 17 is positioned above the canopy and comprises a strobe light. The strobe light draws attention to the rack 10 so that a thief will be less likely to approach it.

A lifting means 38 is disposed in the elongated pole 12. Preferably, the lifting means 38 comprises a plurality of pulley systems 20 that are disposed within the elongated pole 12. Each of the pulley systems 20 include an upper pulley 22 and a lower pulley (not shown). The upper pulley 22 and the lower pulley have a cable 24 extending therearound.

In an alternate embodiment, the lifting means 38 comprises a plurality of threaded worm gears 40. Alternate means for raising and lowering could also be employed.

The elongated pole 12 has a plurality of vertical slots 36 that extend therethrough between the upper and lower ends. An exemplary embodiment has eight slots 36 and eight worm gears 40 or eight slots 36 and eight pulley systems 20.

A plurality of bicycle braces 26 are secured to the lifting means 38 and extend through the slots 36 in the elongated pole 12. For example, the plurality of bicycle braces 26 are secured to the cables 24 of the pulley system 20 or threadedly engage the worm gears 40. The bicycle braces 26 are positionable between a raised and a lowered position. The bicycle braces 26 are positioned towards the lower end of the elongated pole 12 when in the lowered position. The bicycle braces are positioned towards the upper end of the elongated pole 12 to support bicycles in a vertical orientation in a spaced apart relation from the ground surface when in the raised position. Note FIG. 1.

Preferably, the bicycle braces 26 include a forward wheel support 30 and a rear wheel support 32. The forward wheel supports 30 have a generally U-shaped configuration. The forward wheel supports 30 are dimensioned for receiving a front wheel of a bicycle 28 therein. The rear wheel supports 32 are disposed below the forward wheel supports 30. The rear wheel supports 32 are arcuate and in an essentially vertical orientation. The rear wheel supports 32 have a back wheel of the bicycle 28 resting thereon when the front wheel is positioned within the forward wheel supports 30.

In an alternate embodiment, each of the bicycle braces 26 includes a forward wheel support 42 and a rear wheel support 32. Each of the forward wheel supports 42 has a clamping portion 44 that is adapted for clamping around the wheel of the bicycle 28. In an exemplary embodiment, each of the slots 36 has a widened portion (not shown) towards its lower end. Each of the clamping portions 44 comprises a pair of fingers 45 biased apart that are spread apart in the widened part of a lower end of the slot 36 and that clamp together as they move upwards out of the widened portion of the slot 36 into the narrower length of the slot 36.

A motor 46 is disposed in the elongated pole 12 and is in selective communication with the lifting means 38 for selectively raising or lowering the bicycle braces 26 with respect to the ground surface. Preferably, a gear selection means (not shown) permits selective engagement of the motor with only one of the pulley systems 20 or worm gears 40 at a time. For example, a clutch system (not shown) could be used with a motor 46 engaging all of the worm gears 40 at the same time. The clutch system would separate each of the worm gears 40 into two portions, the first portion 48 engaging the motor, and the second portion 49 engaging a bicycle brace. The clutch system would connect the two portions 48,49 of a single worm gear 40 so that the motor 46 would rotate both portions of only that worm gear 40. The gear selection means could also comprise a mechanism (not shown) that moves the motor to a position such that it engages only one of the pulley systems 20 or worm gears 40 at a time.

Preferably, a control panel 34 is secured to the elongated pole 12 and is in communication with the raising means and the motor 46. The control panel 34 controls individual operation of the bicycle braces 26. Ideally, the control panel 34 is coin operated. A user would place money within the control panel 34 and select the particular brace 26 to raise. When the user returns, he would enter a code or the like in order to lower his bicycle 28 for it's removal from the brace 26. More preferably, however, money must be deposited before entry of the code is permitted to prevent a thief from continuously running through numbers until a working code is found. The control panel 34 could also be activated by a credit or debit card.

Figure 3:
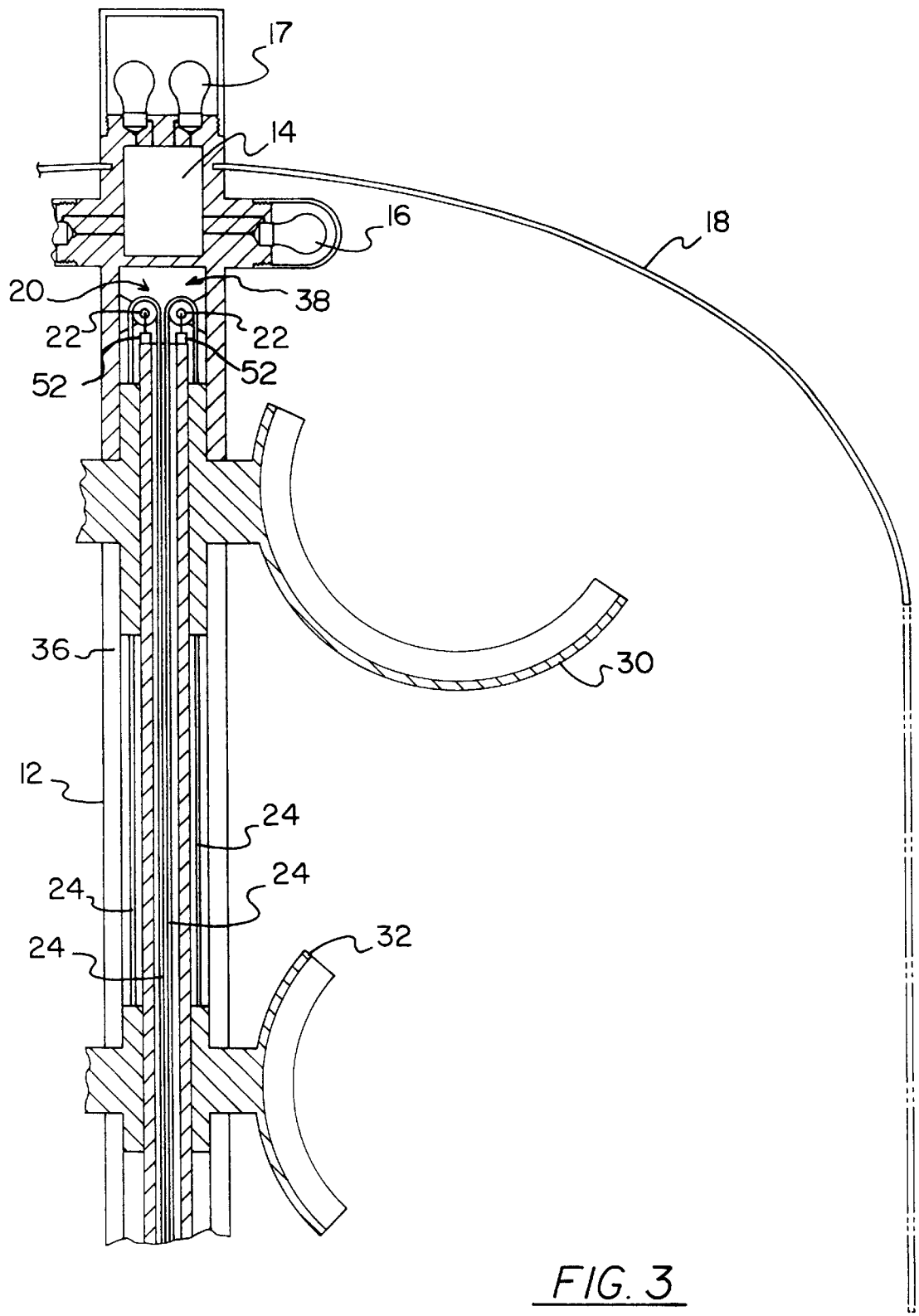
FIG. 3 is a partial cross-sectional view of the present invention.

Ideally, as shown in FIG. 3, a plurality of safety devices 52 engage the upper pulleys for sensing the load on the cables. The safety devices are in communication with the motor. The safety devices stop the motor when a predetermined load weight is sensed on the cable. If too heavy a load is placed on the wheel supports, the motor is stopped to prevent damage to the motor or the bicycle locking rack.

In the alternate embodiment, as shone in FIG. 4, the motor has a clutch release 54 for removing power from a drive shaft 56 that extends through a motor housing 58 and is in communication with the lifting means. The clutch release lets the drive shaft slip with respect to the working part of the motor when a predetermined amount of weight is placed on the wheel supports. This prevents damage to the motor and bicycle locking rack. An exemplary amount of weight would be thirty pounds. Ideally, the clutch release is adjustable so that it may be set to permit slipping at different weights.

In use, a bicyclist would place his bicycle on the forward wheel support 30, insert coins or a card into the control panel 34, and the motor 46 would drive the lifting means 38 to lift the bicycle off the ground. When the bicycle reaches the top of the elongated pole 12, the motor would turn off automatically. When the bicyclist returns, he would insert the card or a key or a code in the control panel 34, and his bicycle would be lowered back to ground level.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle locking rack for suspending a plurality of bicycles above the ground, comprising:

an elongated pole having a lower end secured within a ground surface, an upper end thereof having a canopy secured thereto;

the upper end of the elongated pole having a light control box secured therein, the light control box having a plurality of first lights and a second light in communication therewith, the first lights being positioned under the canopy, the second light being positioned above the canopy and comprising a strobe light;

the elongated pole having a plurality of vertical slots extending therethrough between the upper and lower ends;

a plurality of threaded worm gears being disposed within the elongated pole;

a plurality of bicycle braces threadedly engaging the worm gears and extending through the slots in the elongated pole, the bicycle braces being positionable between a raised and a lowered position, the bicycle braces being positioned towards the lower end of the elongated pole when in the lowered position, the bicycle braces being adapted for supporting bicycles in a vertical orientation in a spaced apart relation from the ground surface when in the raised position;

each of the bicycle braces including a forward wheel support and a rear wheel support, each of the forward wheel supports having a clamping portion being adapted for clamping around a wheel of a bicycle, the rear wheel supports being disposed below the forward wheel supports, the rear wheel supports being arcuate and positioned in an essentially vertical orientation, the rear wheel supports being adapted for having a back wheel of the bicycle resting thereon when the front wheel is positioned within the forward wheel supports;

a motor being disposed in the elongated pole, the motor being in selective communication with the plurality of worm gears for selectively raising or lowering the bicycle braces with respect to the ground surface;

the motor having a clutch release for removing power from a drive shaft extending through a motor housing and being in communication with the lifting means;

a gear selection means for selectively engaging the motor with only one of the worm gears such that rotation of one of the worm gears by the motor results in vertical translation of a pair of respective bicycle braces along a length of the worm gear; and a coin operated control panel being secured to the elongated pole and having a keypad, the coin operated control panel being in communication with the pulley selection means and the motor, wherein the coin operated control panel provides a code for retrieving the bicycle, wherein money must be deposited before entry of the code is permitted.

* * * * *